United States Patent
Srinivasan et al.

(10) Patent No.: US 8,972,594 B2
(45) Date of Patent: Mar. 3, 2015

(54) MEDIA MIX WIRING PROTOCOL FOR MEDIA CONTROL

(75) Inventors: Srivatsa K. Srinivasan, Redmond, WA (US); Timothy M. Moore, Redmond, WA (US); Dhigha D. Sekaran, Redmond, WA (US); Sankaran Narayanan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 12/029,439

(22) Filed: Feb. 11, 2008

(65) Prior Publication Data

US 2009/0204716 A1 Aug. 13, 2009

(51) Int. Cl.
*G06F 15/16* (2006.01)
*G06F 15/173* (2006.01)

(52) U.S. Cl.
CPC ............................ *G06F 15/173* (2013.01)
USPC .......................................................... 709/230

(58) Field of Classification Search
USPC ................... 709/203, 204, 246, 230
See application file for complete search history.

(56) References Cited

U.S. PATENT DOCUMENTS

| | | | |
|---|---|---|---|
| 5,473,363 A * | 12/1995 | Ng et al. | 348/14.09 |
| 5,729,684 A * | 3/1998 | Kuzma | 709/204 |
| 5,794,061 A | 8/1998 | Hansen et al. | |
| 6,922,786 B1 | 7/2005 | Ong | |
| 7,003,086 B1 | 2/2006 | Shaffer et al. | |
| 7,006,616 B1 * | 2/2006 | Christofferson et al. | 379/202.01 |
| 7,007,098 B1 | 2/2006 | Smyth et al. | |
| 7,084,898 B1 * | 8/2006 | Firestone et al. | 348/14.09 |
| 7,257,641 B1 | 8/2007 | Vanbuskirk et al. | |
| 7,280,492 B2 | 10/2007 | Magnuski | |
| 8,495,147 B1 * | 7/2013 | Lang et al. | 709/206 |
| 8,607,287 B2 * | 12/2013 | Walker | 725/95 |
| 2003/0014488 A1 | 1/2003 | Dalal et al. | |
| 2004/0008635 A1 | 1/2004 | Nelson et al. | |
| 2005/0060640 A1 | 3/2005 | Ross et al. | |
| 2005/0088514 A1 | 4/2005 | Deleam et al. | |
| 2006/0080407 A1 | 4/2006 | Rengaraju | |
| 2006/0080740 A1 * | 4/2006 | Bremer et al. | 726/26 |

(Continued)

FOREIGN PATENT DOCUMENTS

| | | |
|---|---|---|
| CN | 138119 A | 11/2002 |
| CN | 1406026 A | 3/2003 |

(Continued)

OTHER PUBLICATIONS

RFC 3265, Jun. 2002: SIP Specific Event Notification.*

(Continued)

*Primary Examiner* — Backhean Tiv
(74) *Attorney, Agent, or Firm* — Andrew Smith; Jim Ross; Micky Minhas

(57) ABSTRACT

Protocol architecture for wiring media streams and specifying mixing behavior in a multipoint control unit. The protocol provides the capability to expose the core mixing algorithms to modification for mixing media without dealing with the functionality of the mixer itself (e.g., ports and IP specifics). The protocol facilitates the wiring of input media streams to output media streams by changing the mixing behavior via changes to the mixing algorithms using the protocol. The protocol operates based on a schema that includes controls related to route, wire, and filter for the mixer input and mixer output.

21 Claims, 10 Drawing Sheets

(56) References Cited

U.S. PATENT DOCUMENTS

| | | | |
|---|---|---|---|
| 2006/0098086 A1 | 5/2006 | Chandra et al. | |
| 2006/0253532 A1 | 11/2006 | Kukoleca | |
| 2007/0038701 A1* | 2/2007 | Majors et al. | 709/204 |
| 2007/0157234 A1 | 7/2007 | Walker | |
| 2007/0206089 A1* | 9/2007 | Eshkoli et al. | 348/14.02 |
| 2007/0220162 A1 | 9/2007 | Levin et al. | |
| 2010/0228677 A1* | 9/2010 | Houston | 705/310 |
| 2014/0020036 A1* | 1/2014 | Hasek et al. | 725/95 |

FOREIGN PATENT DOCUMENTS

| | | |
|---|---|---|
| EP | 0659006 A2 | 6/1995 |
| JP | 2002-532012 | 9/2002 |
| JP | 2003-500935 | 1/2003 |
| RU | 2293368 C2 | 2/2007 |
| WO | WO 00/72563 A1 | 11/2000 |

OTHER PUBLICATIONS

McGlashan et al., "Media Server Control Protocol (MSCP)", The Internet Society, 2006.

Greene et al., "Media Gateway Control Protocol Architecture and Requirements", The Internet Society, 2000.

Barnes et al., "A Framework and Data Model for Centralized Conferencing", The Internet Society, 2004.

"International Search Report", Mailed Aug. 28, 2009, Application No. PCT/US2009/031377, Filed Date Jan. 19, 2009, pp. 1-12.

European Extended Search Report in EP Application 09711068.8, mailed Aug. 10, 2011, 7 pgs.

Horn, D.N. et al., "A Versatile Audio Bridge for Multimedia Conferencing", *Communications,* 1994, ICC '94, Supercomm/ICC '94, Conference Record, 'Serving Humanity Through Communications', IEEE Int'l. Conference on New Orleans, LA, USA, May 1-5, 1994, New York, NY, IEEE, pp. 1754-1762.

Chinese 1st Office Action in Application 200980105107.X, mailed Nov. 29, 2012, 14 pgs.

Chinese 2nd Office Action in Application 200980105107.X, mailed May 13, 2013, 10 pgs.

European Communication in EP Application 09711068.8, mailed Aug. 29, 2011, 1 page.

Japanese Notice of Rejection in Application 2010-546810, mailed Jan. 25, 2013, 4 pgs.

Russian Notice of Allowance in Application 2010133523, mailed May 13, 2013, pgs.

"Final Rejection received for Chinese Application No. 200980105107.X", Mailed Date: Oct. 25, 2013, Filed Date: Jan. 19, 2009, 12 Pages.

Taiwanese Search Report and Office Action in Application 98100037, mailed Mar. 25, 2014 10 pgs.

Canadian Office Action Issued for Canadian Patent Application No. 2711482, mailed Dec. 22, 2014, 4 pgs.

Taiwanese Notice of Allowance in Application 98100037, mailed Oct. 13, 2014, 4 pgs.

European Office Action in Application 09711068,8, mailed Dec. 2, 2014, 5 pgs.

* cited by examiner

```
!<conference-info>
  |
  |--!<users>
  |    |--. . .
  |    |
  |    |--!<user>
  |    |    |--. . . .
  |    |    |--. . . .
  |    |    |
  |    |    |--!<endpoint>
  |    |    |    |-- . . . .
  |    |    |    |-- . . . .
  |    |    |    |
  |    |    |    |--!<media>
  |    |    |    |    |--<type>
  |    |    |    |    |--<display-text>
  |    |    |    |    |--<label>
  |    |    |    |    |--<src-id>
  |    |    |    |    |--<status>
  |    |    |    |    |--<to-mixer>*
  |    |    |    |    |    |--<floor>*
  |    |    |    |    |    |--<controls>*         ┌─502
  |    |    |    |    |    |    |--<route>##
  |    |    |    |    |    |    |   |--<wire>##
  |    |    |    |    |    |    |   |    |--filter>##
  |    |    |    |    |    |    ...
  |    |    |    |    |--<from-mixer>*
  |    |    |    |    |    |--<floor>*           ┌─504
  |    |    |    |    |    |--<controls>*
  |    |    |    |    |    |    |--<route>##
  |    |    |    |    |    |    |   |--<wire>##
  |    |    |    |    |    |    |   |    |--filter>##
```

*FIG. 5*

MEDIA MIX WIRING PROTOCOL FOR MEDIA CONTROL

BACKGROUND

As more conferencing systems begin to offer one or more streams of the same media type (e.g., video), conferencing clients need to be capable of rendering more than one stream as offered by the conferencing systems in an inter-operable manner. Mechanisms such as grouping of SDP (session description protocol, as described in RFC 4566) media lines and SDP media content further help in achieving this goal. However, unless a conferencing client understands the context of how these streams ought to be rendered, the conferencing clients may not be able to render streams of which the client not aware.

Conventional multipoint control unit (MCU) architecture lack of an efficient, flexible protocol to modify the media mix in the mixer of the MCU such that entities can transmit media as specified or receive media as specified over time. One working group is working on solving the above deficiency by controlling the functions of a mixer (e.g., "play a prompt", "expect DTMF", "play this media", etc.). However, the attempts to control or imitate functions of the mixer are then limited to the available functionality.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides an efficient and flexible protocol for wiring media streams and specifying mixing behavior in the multipoint control unit (MCU). Accordingly, entities can transmit media as specified or receive media as specified over time. The protocol provides the capability to expose the core algorithm to modification for mixing media without dealing with the functionality of the mixer itself.

The protocol facilitates media wiring by specifying: a means for uniquely identifying a media stream sent to an entity or received from an entity; a means for an entity to wire a media stream coming from the mixer to contain a mix of other specified streams that have been sent to the mixer (by other identities) without having to deal with ports and other IP-specifics; a means for an entity to wire a media stream sent to the mixer to appear in specific streams sent from the mixer (sent to other identities); a means to communicate the wiring of the various media streams to participants allowed to view the wiring based on local policy of the mixer; and, a means where the conference leader can change the main participant mix to include a stream from another entity (participant), and all participants in the conference can perceive the identity of the other entity.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

FIG. 5 illustrates an exemplary schema definition for a protocol that can access and modify mixing behavior at the core mixing algorithms.

DETAILED DESCRIPTION

Figure 1:
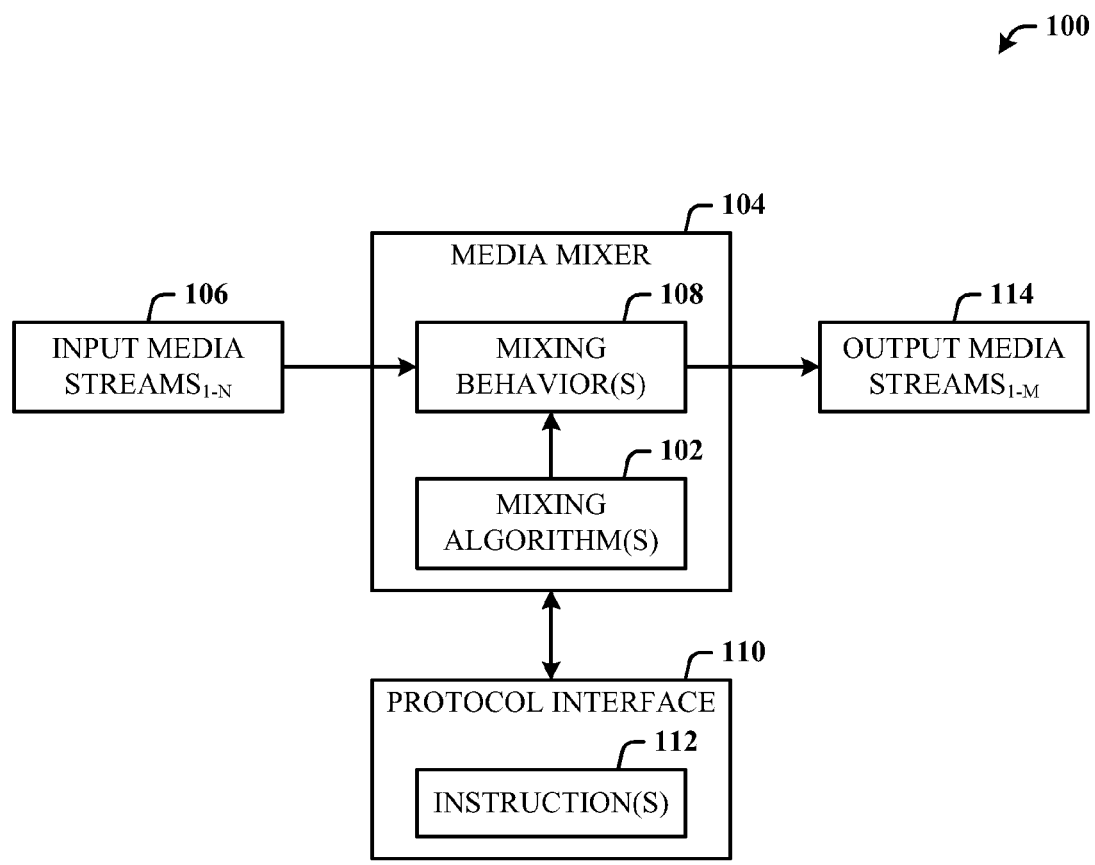
FIG. 1 illustrates a computer-implemented media control system for modifying mixing algorithm behavior.

The disclosed architecture provides a protocol for accessing and manipulating the core mixing algorithms of media mixers, for example, a multipoint control unit (MCU). This also applies to a client-based implementation, rather than network-based implementations, where the user can manipulate the core mixing of audio and video at the client level.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented media control system 100 for modifying mixing algorithm behavior. The system 100 includes one or more mixing algorithms 102 of a media mixer 104 for mixing input media streams 106 according to one or more mixing behaviors 108. The mixer 104 is a logical entity receives the set of media streams of the same type (e.g., audio), combines the media in a type-specific manner, and redistributes the result to a single output or multiple outputs (e.g., session participant(s)). The system 100 also includes a protocol interface 110 that includes one or more instructions 112 for modifying the mixing behavior 108 of the mixing algorithm(s) 102 to wire the input media streams 106 to produce one or more specific output media streams 114.

The one or more instructions 112 of the protocol interface 110 facilitate modification of the mixing algorithms 102 to effect the mixing behavior(s) 108 to uniquely identify a media stream sent to an entity or to uniquely identify a media stream received from the entity, to wire the input media streams to the media mixer into the specific output stream exclusive of mixer port or IP management functions, and to expose wiring information to an entity based on a policy. The policy can be an enterprise policy created and imposed by an administrator, for example.

The one or more instructions 112 of the protocol interface 110 also facilitate changing in participation of a session by participants by deleting at least one of many main participants from the session or adding a new participant to the session. The protocol interface 110 includes one or more instructions 112 for notifying the main participants of the change in participation to the session. For example, if main participants A, B and C are in a conference, and participant A has requested to view participant B's video stream, participant C is not allowed to know that participant A is watching participant B. However, participant B can be allowed to know that participant A is watching participant B's media stream. The protocol interface 110 includes one or more instructions 112 for adding an input media stream of a new participant to the session and for presenting entity information of the new participant to the main participants.

In one implementation, the protocol interface 110 includes a new set of instructions for interacting with the mixing algorithms 102 to generate the mixing behavior(s) 108. In an alternative implementation, the one or more instructions 112 include extensions to the existing set of controls for generate the mixing behavior(s) 108. The new set of instructions and/or the control extensions are based on a schema that includes one or more schema elements of route, wire, and filter.

Figure 2:
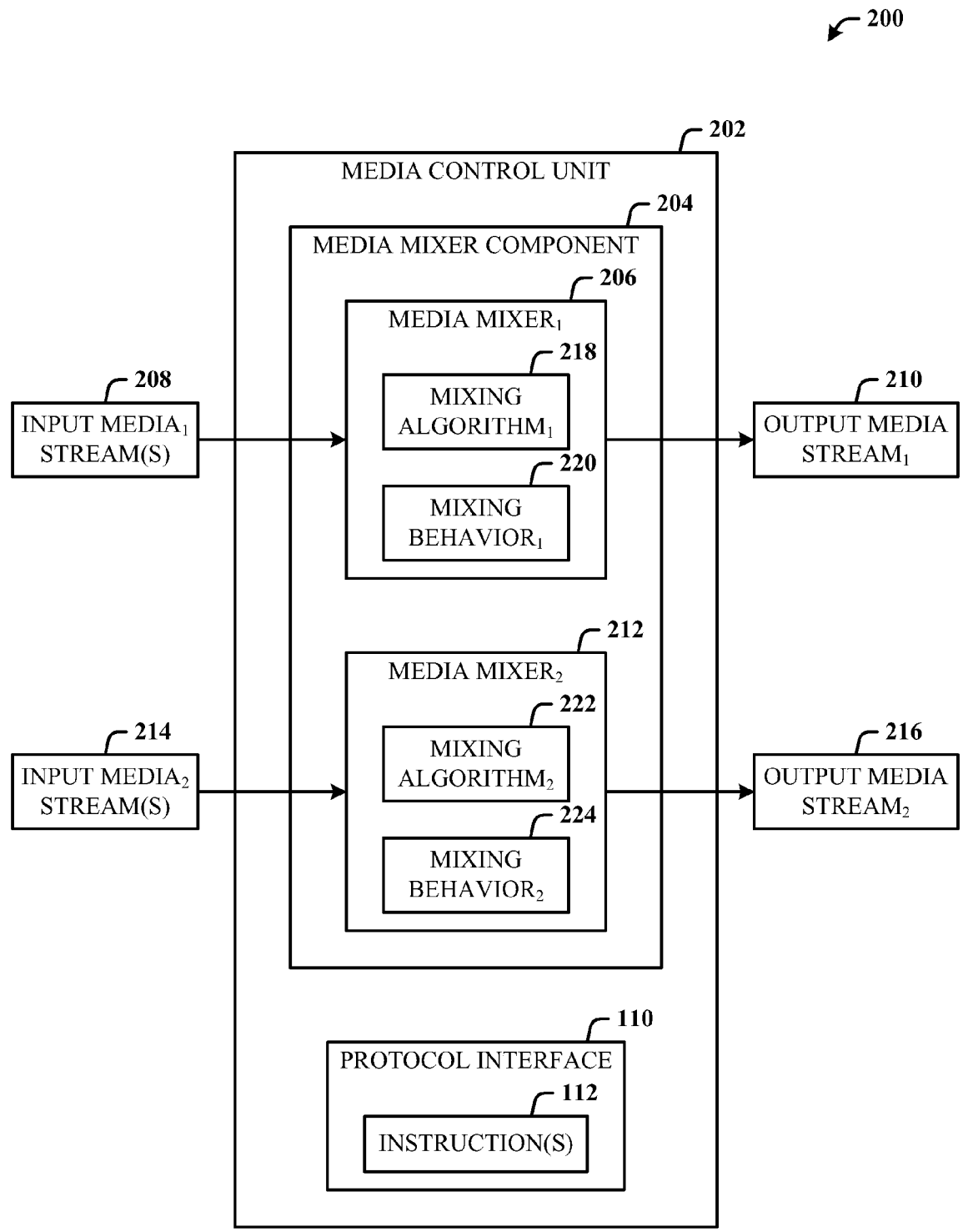
FIG. 2 illustrates a media system where a media control unit includes a media mixer component for mixing input streams based on changes to core mixing algorithms.

FIG. 2 illustrates a media system 200 where a media control unit 202 includes a media mixer component 204 for mixing input streams based on changes to core mixing algorithms. Here, the media mixer component 204 includes two mixers: a first mixer 206 for receiving a first type of input media stream(s) 208 (e.g., audio) for wiring (or routing) to an output media stream 210 of the same type, and a second mixer 212 for receiving a second type of input media stream(s) 214 (e.g., video) for wiring (or routing) to an output media stream 216 of the same type. The first media mixer 206 includes a first mixing algorithm 218 for generating a first mixing behavior 220.

A user can manipulate the first mixing algorithm 218 to change the first mixing behavior 220 via the protocol interface 110 when communicating one or more of the instructions 112 to the first mixing algorithm 218 of the first media mixer 206. Similarly, the second media mixer 212 includes a second mixing algorithm 222 for generating a second mixing behavior 224. The user can manipulate the second mixing algorithm 222 to change the second mixing behavior 224 via the protocol interface 110 when communicating one or more of the instructions 112 to the second mixing algorithm 222 of the second media mixer 212.

The one or more instructions 112 facilitate modification of the mixing algorithms 102 to wire the input streams (208 and 214) as desired. The one or more instructions 112 manage the mixing behavior(s) (220 and 224) to uniquely identify a media stream sent to an entity or to uniquely identify a media stream received from the entity, to wire the input media streams to the media mixer into the specific output stream exclusive of mixer port or IP management functions, and to expose wiring information to an entity based on a policy.

The system 200 facilitates wiring of a single input stream (e.g., of stream(s) 208 and 214) from point to point, from point to multiple points, multiple points to multiple points, and from multiple points to a single point. The system 200 can be employed as a network node (e.g., a server) and/or as a client on a client computing system, for example.

Figure 3:
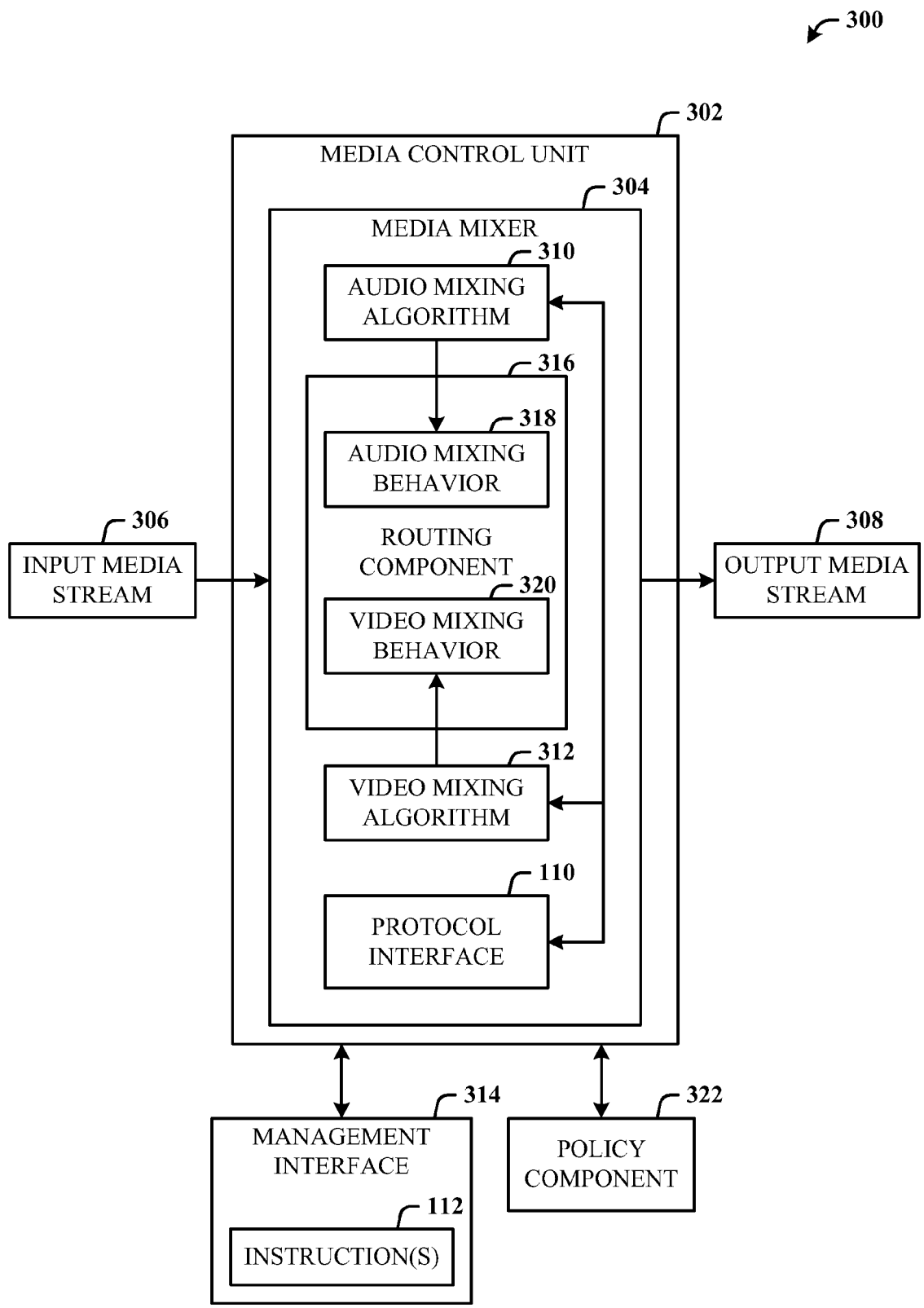
FIG. 3 illustrates an alternative system for modifying mixing algorithm behavior.

FIG. 3 illustrates an alternative system 300 for modifying mixing algorithm behavior. The system 300 includes a media control unit 302 having a media mixer 304 from receiving an input media stream 306, and routing the input stream 306 to an output media stream 308 in accordance with modified mixing behaviors. More specifically, the media mixer 304 includes an audio mixing algorithm 310 for mixing audio into the input stream 306, and a video mixing algorithm 312 for mixing video into the input media stream 306. The media mixer 304 includes the protocol interface 110 for processing the protocol instructions 112 from a management interface 314. In other words, a user can interact via the management interface 314 to send one or more instructions 112 via the protocol interface 110 to modify the core audio mixing algorithm 310 and/or the core video mixing algorithm 312.

The mixing algorithms (310 and 312) generate mixing behaviors that are processed by a routing component 316 for routing the input media stream 306 to the output media stream 308. The routing component 316 receives and processes an audio mixing behavior 318 generated from the audio mixing algorithm 310 and a video mixing behavior 320 from the video mixing algorithm 312. In other words, the input media stream 306 can be mixed with audio and/or video signals for routing as a mixed output media stream 308 to an output entity.

A policy component 322 receives and processes one or more policies that can regulate how the mixing is to be done and if the mixing will be performed based on the receiving entity, source users, etc. The policy component 322 can include a session policy server that governs the operation of the session.

Figure 4:
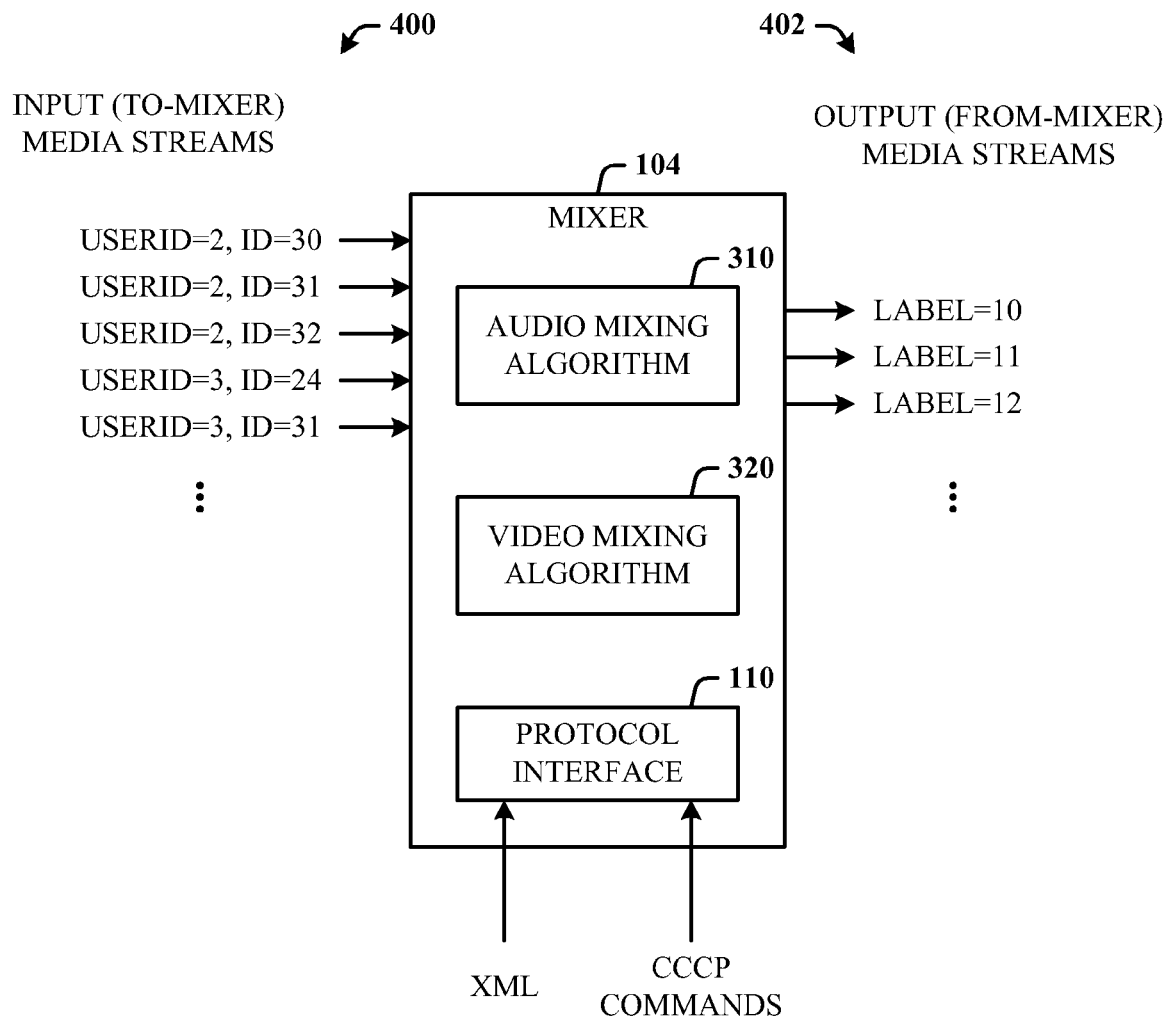
FIG. 4 illustrates the exemplary mixer for wiring input streams to output streams at the mixing algorithm level.

FIG. 4 illustrates the exemplary mixer 104 for wiring input streams to output streams at the mixing algorithm level. The mixer 104 receives input (or to-mixer) media streams 400, and mixes the input streams 400 according to the video mixing algorithm 310 and the audio mixing algorithm 320 to produce output (or from-mixer) media streams 402. Modification of the mixing algorithms (310 and 320) can occur via the protocol interface 110.

The input streams 400 can be identified with identity information for the user and the type of media stream, for example, a user identity (userID=xx) and a media stream identity (ID=xx). In this example, input media stream types ID=30, ID=31, and ID=32 and userID=2 can be for a second session participant's (or endpoint) main audio stream, main video stream, and secondary video stream, respectively. Similarly, input media stream types ID=24 and ID=31 are associated with userID=3 for a third session participant's (or endpoint) main audio stream and main video stream, respectively. Other input streams 400 can be part of the conference session.

A "label" parameter identifies the media stream to and from the mixer 104. As indicated previously, the input streams 400 to the mixer 104 (from a specific user and endpoint) are identified by an ID in the conferencing data model. The label is unique throughout the conferencing data model. The ID is unique within the endpoint media element in the data model and is generated by the conferencing server.

Consider that the label=10 is the stream containing the audio stream mix from all audio input streams offered to every session participant, label=11 includes a video mix, and that label=12 is an alternate mix of the video streams that is voice activated. The mixer 104 mixes the incoming video streams 400 from the participants into both the label=11 and label=12 output streams. This is one example of a mixer model; other mixer models can interpret the input streams differently. However, the introduction of the protocol interface 110 facilitates modification of the mixing algorithms in accordance with the disclosed architecture. The protocol interface 110 can receive change or modifications to the mixing algorithms (310 and 320) via XML, for example, and/or CCCP (centralized conference control protocol) commands.

FIG. 5 illustrates an exemplary schema definition 500 for a protocol that can access and modify mixing behavior at the core mixing algorithms. The schema definition 500 can be as follows. In one implementation, the schema defines new controls extensions (e.g., route, wire and filter) from controls that are defined in a centralized conferencing (XCON) data model. The newly-added elements to the schema definition 500 are referenced in the following tree view with a "##" and circumscribed as 502 for the input to the mixer and 504 as the output of the mixer.

```
!<conference-info>
    |
    |--!<users>
    |    |--...
    |    |
    |    |--!<user>
    |    |    |--....
    |    |    |--....
    |    |    |
    |    |    |--!<endpoint>
    |    |    |    |--....
    |    |    |    |--....
    |    |    |    |
    |    |    |    |--!<media>
    |    |    |    |    |--<type>
    |    |    |    |    |--<display-text>
    |    |    |    |    |--<label>
    |    |    |    |    |--<src-id>
    |    |    |    |    |--<status>
    |    |    |    |    |--<to-mixer>*
    |    |    |    |    |    |--<floor>*
    |    |    |    |    |    |--<controls>*
    |    |    |    |    |    |    |--<route>##
    |    |    |    |    |    |    |    |--<wire>##
    |    |    |    |    |    |    |    |    |--<filter>##
    |    |    |    |    |    |    ...
    |    |    |    |    |--<from-mixer>*
    |    |    |    |    |    |--<floor>*
    |    |    |    |    |    |--<controls>*
    |    |    |    |    |    |    |--<route>##
    |    |    |    |    |    |    |    |--<wire>##
    |    |    |    |    |    |    |    |    |--<filter>##
```

Following are a series of examples that illustrate ways in which the protocol architecture facilitates media wiring. The data contained within such a schema is shown in the following example. Consider a conference session with the media state as follows for a conference sip:conf233@example.com hosted on the MCU https://Mcu55.company.com:444/MCU.

```
<users>
    <user entity="sip:foo@example.com">
        <endpoint entity="sip:foo@example.com;gr=14837492">
            <media id="12">
                <!--this is the default stream for foo@example.com-->
                <type>audio</type>
                <status>sendrecv</status>
                <label>1111</label>
                <status>sendrecv</status>
            </media>
            <media id="34">
                <!--this is the stream where foo@example.com wants
to manipulate the mixing routes-->
                <type>audio</type>
                <status>recvonly</status>
                <label>abcd123</label>
                <!--Note: No media routes defined here-->
            </media>
        </endpoint>
    </user>
    <user entity="sip:bar1@contoso.com">
        <endpoint entity="sip:bar1@contoso.com;gr=14837492">
            <media id="56">
                <!--this is the default stream for foo@example.com-->
                <type>audio</type>
                <status>sendrecv</status>
                <label>efgh123</label>
            </media>
        </endpoint>
    </user>
    <user entity="sip:bar2@fabrikam.com">
        <endpoint entity="sip:bar2@fabrikam.com;gr=67432333">
            <media id="78">
                <type>audio</type>
                <status>sendrecv</status>
                <label>ijkl456</label>
            </media>
        </endpoint>
    </user>
</users>
```

Following is an example of CCCP command(s) for modifying the media route for a participant. Consider that the entity sip:foo@example.com wants to modify the media route based on the stream. The entity may do so by issuing the following CCCP command "modifyEndpointMedia". The following example shows a request that foo@example.com is making to receive streams from bar1@contoso.com and bar2@fabrikam.com. (The XMLNS specification is omitted for readability.)

```
<request
    requestId="1"
    from="client"
    to="MCU-
    (xmlns spec was here)
    <modifyEndpointMedia>
        <endpointKeys
            confEntity="sip:conf233@example.com"
            userEntity="sip:foo@example.com"
            endpointEntity="sip:foo@example.com;gr=14837492"/>
        <media id="34"
            xmlns="urn:ietf:params:xml:ns:conference-info">
            <type>audio</type>
            <status>recvonly</status>
            <label>abcd123</label>
            <from-mixer>
                <controls>
                    <!--Note: Modified routing table-->
                    <route>
                        <wire user-
entity="sip:bar1@contoso.com" endpoint-
entity="sip:bar1@contoso.com;gr=4940254792" label="efgh123">
                            <filter>dtmf</filter>
                        </wire>
                        <wire user-
entity="sip:bar2@fabrikam.com" endpoint-
entity="sip:bar2@fabrikam.com;gr=67432333" label="ijkl456">
                            <filter>dtmf</filter>
                        </wire>
                    </route>
                </controls>
            </from-mixer>
        </media>
    </modifyEndpointMedia>
</request>
```

The response can be as follows:

```
<response
    requestId="1"
    from="MCU"
    to="Client"
```

```
      code="success"
      (xmlns spec was here)
      <modifyEndpointMedia/>
    </response>
```

The new state of the conference session (a media route for a participant) can be communicated to other participants in the conference using the state notification as shown below or can be polled using a new CCCP command. Following is an example of a notification option.

```
<users>
  <user entity="sip:foo@example.com">
    <endpoint entity="sip:foo@example.com;gr=14837492">
      <media id="12">
        <type>audio</type>
        <status>sendrecv</status>
        <label>1111</label>
        <status>sendrecv</status>
      </media>
      <media id="34">
        <type>audio</type>
        <status>recvonly</status>
        <label>abcd123</label>
        <from-mixer>
          <controls>
            <!-Note: Modified routing table in C3P notification→
            <route>
              <wire user-entity="sip:bar1@contoso.com" endpoint-entity="sip:bar1@contoso.com;gr=4940254792" label="efgh123">
                <filter>dtmf</filter>
              </wire>
              <wire user-entity="sip:bar2@fabrikam.com" endpoint-entity="sip:bar2@fabrikam.com;gr=67432333" label="ijkl456">
                <filter>dtmf</filter>
              </wire>
            </route>
          </controls>
        </from-mixer>
      </media>
    </endpoint>
  </user>
  <user entity="sip:bar1@contoso.com">
    <endpoint entity="sip:bar1@contoso.com;gr=14837492">
      <media id="56">
        <type>audio</type>
        <status>sendrecv</status>
        <label>efgh123</label>
      </media>
    </endpoint>
  </user>
  <user entity=" sip:bar2@fabrikam.com">
    <endpoint entity="sip:bar2@fabrikam.com;gr=67432333">
      <media id="78">
        <type>audio</type>
        <status>sendrecv</status>
        <label>ijkl456</label>
      </media>
    </endpoint>
  </user>
</users>
```

With respect to the polling-option, if there are size considerations with the previous notification-option and/or there is no capability for the system to filter out elements that require privacy functions, a polling mechanism can be used to retrieve the wire route. The mechanism returns a list of users and endpoints (session participants) that are watching a specific endpoint stream. The example below illustrates a command that can be used to retrieve media watcher state for bar1@contoso.com and endpoint sip:bar1@contoso.com; gr=4940254792 with media id=56. Since foo@example.com is the only entity watching the stream, that user entity and endpoint information is returned.

```
<request
  requestId="1"
  from="Client"
  to="MCU"
  (xmlns spec was here)
  <getMediaWatchers>
    <endpointKeys
      confEntity="sip:conf233@example.com"
      userEntity="sip:bar1@contoso.com"
      endpointEntity=sip:bar1@contoso.com;gr=4940254792/>
  </getMediaWatchers>
</request>
```

The response can be as follows:

```
<response
  requestId="1"
  from= "MCU"
  to= "Client"
  code="success"
  <getMediaWatchers>
    <users>
      <user entity="sip:foo@example.com">
        <endpoint entity="sip:foo@example.com;gr=14837492"/>
          <!-Note: There are no other XML elements returned under endpoint or user or users. -->
      </user>
    </users>
  </getMediaWatchers>
</response>
```

Following is exemplary CCCP command for modifying the main media route effecting the session mix of participants.

```
<request
  requestId="1"
  from="Client"
  to="MCU"
  (xmlns spec was here)
  <modifyEntityState>
    <entityKeys
      confEntity=sip:conf233@example.com
      entityView="sip:srivats@microsoft.com;gruu;opaque=app:conf:audio-video:id:f63ad350e41f46798244bda6630db317"
    />
    <media label="main-video"
      xmlns="urn:ietf:params:xml:ns:conference-info">
      <from-mixer>
        <controls>
          <!-Note: Modified routing table→
          <route>
            <wire user-entity="sip:bar1@contoso.com" endpoint-entity="sip:bar1@contoso.com;gr=4940254792" label="efgh123">
              <filter>dtmf</filter>
            </wire>
          </route>
        </controls>
      </from-mixer>
    </media>
  </modifyEntityState>
</request>
```

The response can be as follows:

```
<response
    requestId="1"
    from="MCU"
    to="Client"
    code="success"
    (xmlns spec was here)
    <modifyEntityState/>
</response>
```

Following is an example of notification of the main media route. The new state of the conference can be communicated to other participants in the conference session using the state notification as shown below.

```
<msci:entity-view ci:state="full"
entity="sip:srivats@microsoft.com;gruu;opaque=app:conf:audio-
video:id:f63ad350e41f46798244bda6630db317">
    <msci:entity-capabilities>
        <msav:capabilities>
            <msav:supports-audio>false</msav:supports-audio>
            <msav:supports-video>true</msav:supports-video>
        </msav:capabilities>
    </msci:entity-capabilities>
    <msci:entity-state>
        <msci:media>
            <entry label="main-video">
                <type>video</type>
                <status>sendrecv</status>
                <msci:modal-parameters>
                    <msci:video-parameters>
                        <msav:video-mode>dominant-speaker-
                        switched</msav:video-mode>
                    </msci:video-parameters>
                </msci:modal-parameters>
                <controls>
                    <route>
                        <wire user-entity="sip:bar1@contoso.com" endpoint-
                        entity="sip:bar1@contoso.com;gr=4940254792"
                        label="efgh123">
                            <filter/>
                        </wire>
                    </route>
                </controls>
            </entry>
            <entry label="panoramic-video">
                <type>panoramic-video</type>
                <status>sendrecv</status>
            </entry>
        </msci:media>
    </msci:entity-state>
</msci:entity-view>
```

With respect to privacy concerns, the protocol instructions can communicate how the media is wired to other participants in the conference based on local policy. Local conference server policy can be taken into consideration whether the participant receiving this information is authorized to receive the wired media or not.

To accommodate the notification option, the Notifier (defined in RFC 3265 and RFC 4353 as a user agent that generates Notify requests for the purpose of notifying subscribers of the state of a resource) filters certain elements based on where the notification is being sent. If there are no privacy considerations, the Notifier can send this information to all participants or may choose to not send the information at all.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 6:
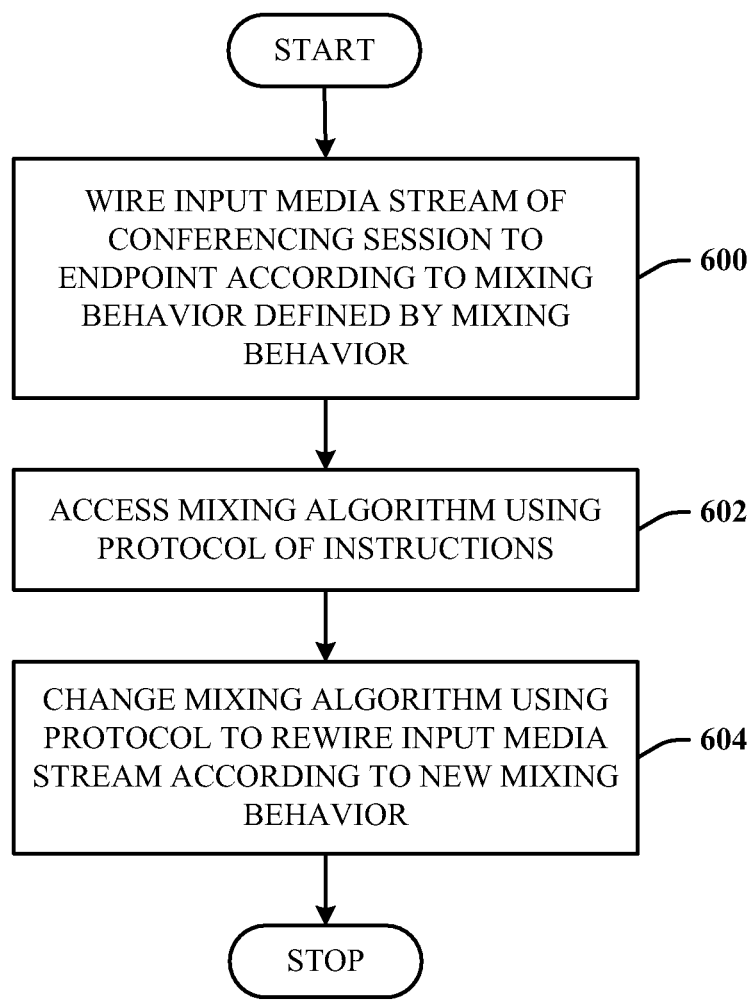
FIG. 6 illustrates a method of managing media streams.

FIG. 6 illustrates a method of managing media streams. At 600, an input media stream of a conferencing session is wired to an endpoint according to a mixing behavior defined by a mixing algorithm. At 602, the mixing algorithm is accessed using a protocol of instructions. At 604, the mixing algorithm is changed using the protocol to rewire the input media stream according to a new mixing behavior.

Figure 7:
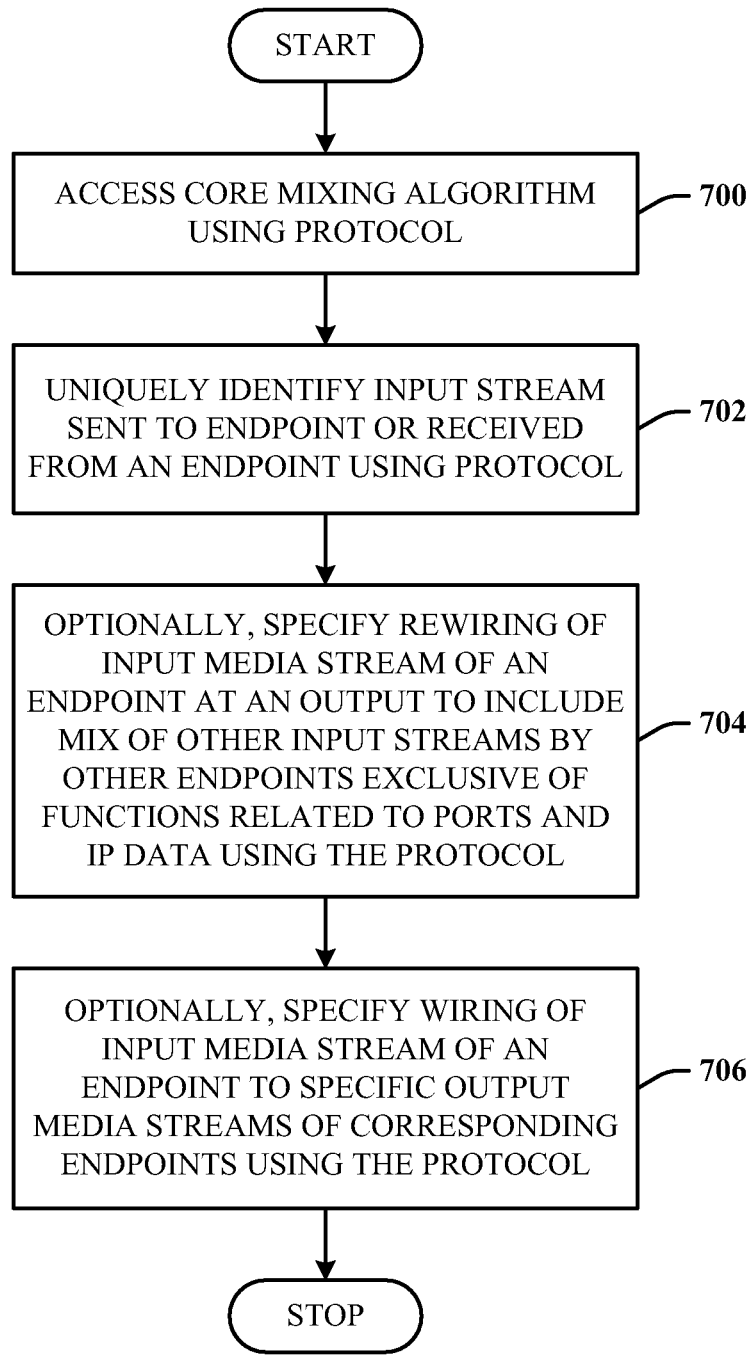
FIG. 7 illustrates a method of manipulating core mixing algorithms of a media mixer to rewire session media streams.

FIG. 7 illustrates a method of manipulating core mixing algorithms of a media mixer to rewire session media streams. At 700, the core mixing algorithm(s) can be accessed using a protocol. At 702, the input stream sent to an endpoint or received from an endpoint can be uniquely identified using the protocol. At 704, optionally, specify rewiring of the input media stream of an endpoint at an output to include a mix of other input streams by other endpoints exclusive of functions related to ports and IP data using the protocol. At 706, optionally, specify wiring of the input media stream of an endpoint to specific output media streams of corresponding endpoints using the protocol.

Figure 8:
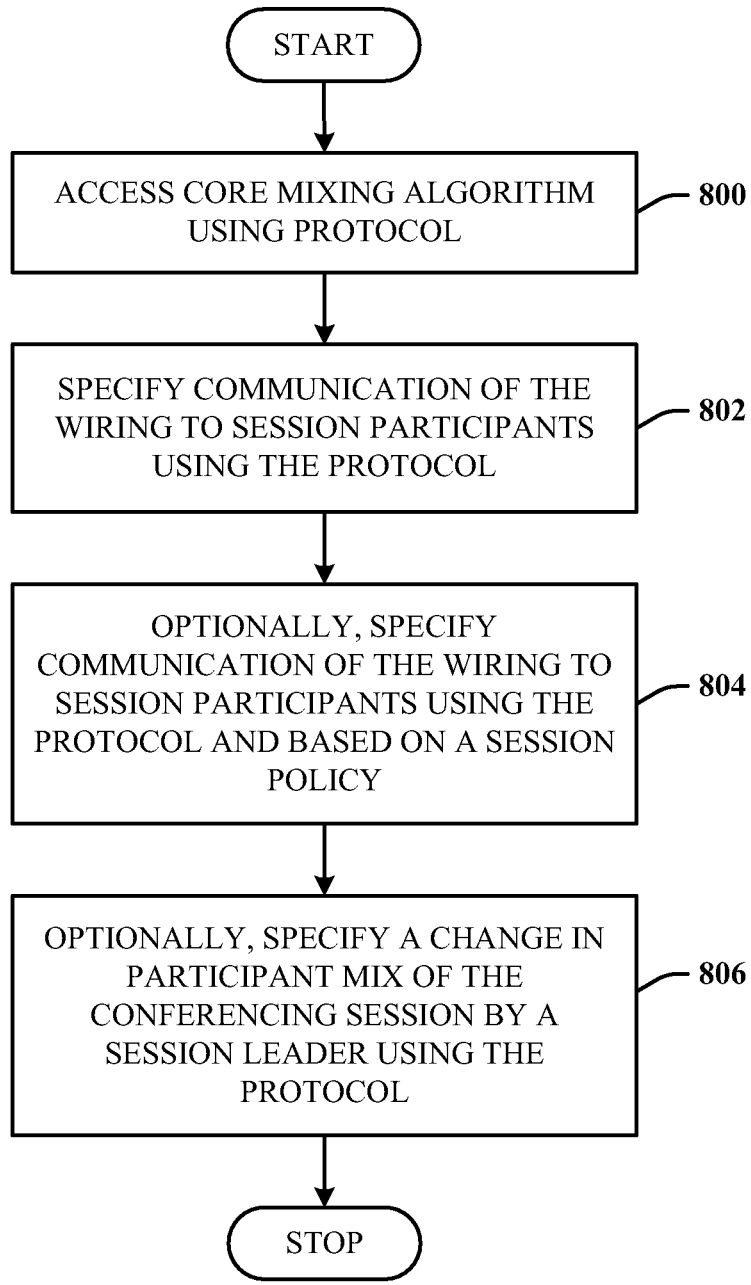
FIG. 8 illustrates a method of manipulating core mixing algorithms of a media mixer to rewire session media streams.

FIG. 8 illustrates a method of manipulating core mixing algorithms of a media mixer to rewire session media streams. At 800, the core mixing algorithm(s) can be accessed using a protocol. At 802, communication of the wiring to session participants is specified using the protocol. At 804, communication of the wiring is specified to session participants using the protocol and based on a session policy. At 806, a change in participant mix of the conferencing session by a session leader is specified using the protocol.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 9:
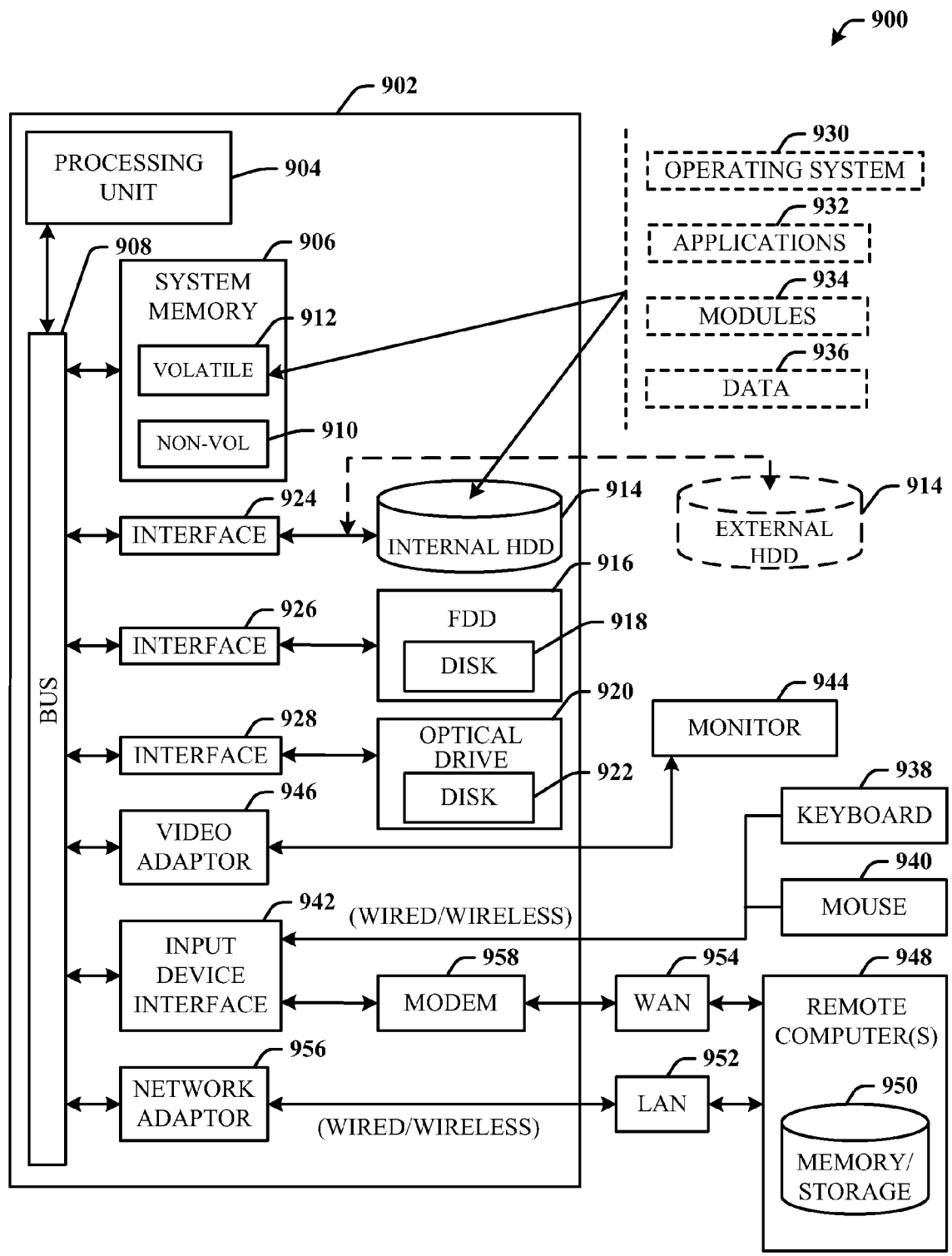
FIG. 9 illustrates a block diagram of a computing system operable to execute media stream wiring at the core mixing algorithm level in accordance with the disclosed protocol architecture.

Referring now to FIG. 9, there is illustrated a block diagram of a computing system 900 operable to execute media stream wiring at the core mixing algorithm level in accordance with the disclosed protocol architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. The one or more application programs 932, other program modules 934, and program data 936 can include the mixing algorithms 102, media mixer 104, input media streams 106, mixing behaviors 108, protocol interface 110, protocol instructions 112, output media streams 114, audio mixing algorithm 310, video mixing algorithm 320, input media streams 400 output media streams 402, and the schema 500, for example.

All or portions of the operating system, applications, modules, and/or data can also be cached in the volatile memory 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956.

The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
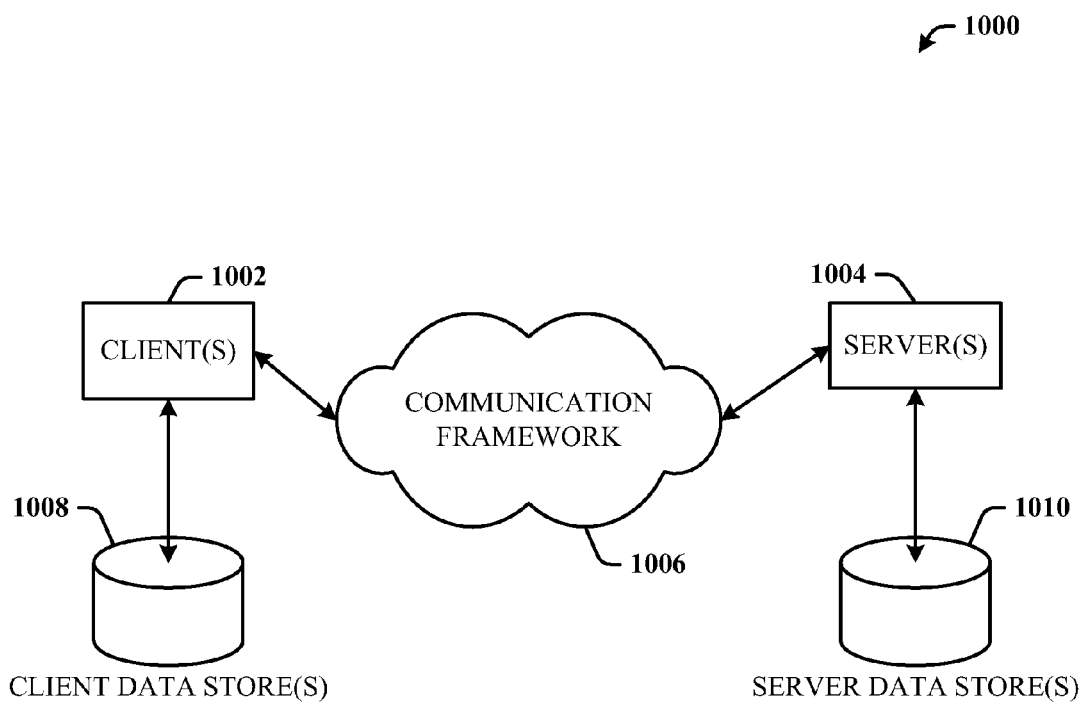
FIG. 10 illustrates a schematic block diagram of an exemplary client-server computing environment for accessing core mixing algorithms using an access protocol.

Referring now to FIG. 10, there is illustrated a schematic block diagram of an exemplary client-server computing environment 1000 for accessing core mixing algorithms using an access protocol. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The server(s) 1004 can include the mixing algorithms 102, media mixer 104, input media streams 106, mixing behaviors 108, protocol interface 110, protocol instructions 112, output media streams 114, media control unit 202, media mixer component 204, media mixers (206 and 212), mixing algorithms (218 and 222) and corresponding mixing behaviors (220 and 224), audio mixing algorithm 310, video mixing algorithm 320, input media streams 400 output media streams 402, and the schema 500, for example. The clients(s) 1002 can also include some or all of the entities described for the server(s) 1004, except the MCU, which is typically a network-based entity.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented media control system executed by a processor, comprising:
   a first media mixer for receiving a first type of input media stream and a second media mixer for receiving a second type of input media stream;
   a first mixing algorithm of the first media mixer for routing a plurality of input media streams of the first type according to a first mixing behavior, and a second mixing algorithm of the second media mixer for routing a plurality of input media streams of the second type according to a second mixing behavior; and
   a protocol interface that includes instructions for modifying at least one of the first mixing behavior or the second mixing behavior in the respective mixing algorithm to wire the respective input media streams to produce a plurality of output streams, each output stream identified by a unique identifier;
   the protocol interface further including instructions for notifying a plurality of participants of the wiring of the input media streams to the output media streams, the protocol interface further including instructions to receive a request to modify the first mixing algorithm; and
   wherein the instructions to receive a request to modify the first mixing algorithm, when executed, perform a method, the method including:
      receiving a request from a client to alter one output stream, the request including a unique user identifier associated with one input media stream of the first type, the request further including a unique endpoint identifier of the one output stream, and the request further including a centralized conference control protocol command; and
      wherein the centralized conference control protocol command includes the command modifyEndpointMedia, wherein the modifyEndPointMedia command instructs the protocol interface to modify the first mixing algorithm to alter the one output stream.

2. The system of claim 1, wherein the protocol interface includes one or more instructions for modifying at least one of the first mixing behavior or the second mixing behavior to uniquely identify a media stream sent to an entity or to uniquely identify a media stream received from the entity.

3. The system of claim 1, wherein the protocol interface includes one or more instructions for modifying at least one of the first mixing behavior or the second mixing behavior to wire the plurality of input media streams of the media mixer into an output stream exclusive of mixer port or IP management functions.

4. The system of claim 1, wherein the protocol interface includes one or more instructions for exposing wiring information to an entity based on a policy.

5. The system of claim 1, wherein the protocol interface includes one or more instructions for changing participation in a session by deleting a main participant from the session or adding a new participant to the session.

6. The system of claim 5, wherein the protocol interface includes one or more instructions for notifying a main participant of the change in participation to the session.

7. The system of claim 5, wherein the protocol interface includes one or more instructions for adding an input media stream of a new participant to the session and for presenting identity of the new participant to the main participant.

8. The system of claim 1, wherein the protocol interface includes one or more instructions for operating on new control extensions related to one or more of route, wire, and filter.

9. The system of claim 1, wherein the protocol interface and the mixing algorithm are employed in a media control unit.

10. A computer-implemented media control system executed by a processor, comprising:
  first and second mixing algorithms of a media control unit for wiring input media streams of a first type of media stream and a second type of media stream to produce output media streams that are uniquely identifiable for routing to output endpoints, wherein the output media streams are routed to specific endpoints based, at least in part, on a type of the output media streams; and
  a protocol interface having one or more instructions for notifying the output endpoints of the wiring of the input media streams that produced the output media streams and modifying at least one of the first mixing algorithm or the second mixing algorithm to change the wiring of at least one of the input media streams to the output media streams, based on a request to route the at least one input media stream to an output endpoint; and
  the protocol interface having instructions for receiving a request to modify the first mixing algorithm, wherein the instructions, when executed, perform a method, the method including:
    receiving a request from a client to alter one output media stream, the request including a unique user identifier associated with one input media stream of the first type, the request further including a unique endpoint identifier of the one output media stream, and the request further including a centralized conference control protocol command; and
    wherein the centralized conference control protocol command includes the command modifyEndpointMedia, wherein the modifyEndPointMedia command instructs the protocol interface to modify the first mixing algorithm to alter the one output media stream.

11. The system of claim 10, wherein the first type of media stream is an audio stream and the second type of media stream is a video stream, the first and second mixing algorithms include an audio mixing algorithm which when modified via the protocol interface changes an audio mixing behavior to an output endpoint of at least one audio stream, and the first and second mixing algorithms further include a video mixing algorithm which when modified via the protocol interface changes a video mixing behavior to an output endpoint of at least one video stream.

12. The system of claim 10, wherein the protocol interface includes one or more instructions for modification of the first and second mixing algorithms to route the input streams from one endpoint to another endpoint, from one endpoint to multiple endpoints, from multiple endpoints to a single endpoint, or from multiple endpoints to multiple endpoints.

13. A computer-implemented method of managing media streams, comprising:
  within a conference session having multiple endpoints, receiving at least two input media streams of multiple types from each of the multiple endpoints;
  wiring at least one input media stream of the conferencing session to generate an output media stream to each endpoint according to a mixing behavior defined by a mixing algorithm, wherein at least one output media stream to at least one endpoint is routed to the at least one endpoint based, at least in part, on a type of the output media stream, and wherein the at least one input media stream selected from multiple types of media streams;
  communicating a media state of the conference session to each of the endpoints, the media state indicating the wiring of the input media streams to the output media streams;
  receiving a request identifying a specific output media stream being received by a first one of the endpoints, the request requesting that the specific output media stream be received by a second one of the endpoints;
  accessing the mixing algorithm using a protocol of instructions;
  changing the mixing algorithm using the protocol to rewire the input media streams according to as new mixing behavior;
    receiving a request from a client to alter the at least one output media stream, the request including a unique user identifier associated with the at least one input media stream of the first type, the request further including a unique endpoint identifier of the at least one output media stream, and the request further including a centralized conference control protocol command; and
    wherein the centralized conference control protocol command includes the command modifyEndpointMedia, wherein the modifyEndPointMedia modifies the at least one output media stream using a protocol interface.

14. The method of claim 13, further comprising specifying changes to the mixing algorithm using an XML file or CCCP commands.

15. The method of claim 13, further comprising uniquely identifying the input stream sent to an endpoint or received from an endpoint using the protocol.

16. The method of claim 13, further comprising specifying rewiring of the input media stream of an endpoint at an output to include a mix of other input streams by other endpoints exclusive of functions related to ports and IP data using the protocol.

17. The method of claim 13, further comprising specifying wiring of the input media stream of an endpoint to specific output media streams of corresponding endpoints using the protocol.

18. The method of claim 13, further comprising specifying communication of the wiring to session participants using the protocol.

19. The method of claim 18, further comprising specifying communication of the wiring to session participants using the protocol and based on a session policy.

20. The method of claim 13, further comprising specifying a change in participant mix of the conferencing session by a session leader using the protocol.

21. A computer implemented method for mixing incoming media streams, comprising:
- receiving a plurality of incoming media streams, including at least a first incoming media stream from a first client and a second incoming media stream from a second client;
- mixing the plurality of incoming media streams according to a mixing algorithm to create an output stream;
- receiving protocol instructions from the first client to change the output stream based, at least in part, on a type of the first output stream, wherein the protocol instructions include a unique user identifier associated with the first incoming media stream, the request further including a unique endpoint identifier of the output stream, and the request further including a centralized conference control protocol command;
- wherein the centralized conference control protocol command includes the command modifyEndpointMedia, wherein the modifyEndPointMedia command instructs a protocol interface to modify the output stream.

* * * * *